United States Patent [19]

Izumikawa

[11] 4,107,753
[45] Aug. 15, 1978

[54] CASSETTE HOLDER CAPABLE OF ROTATION THROUGH A LARGER ANGLE OF INCLINATION

[75] Inventor: Akira Izumikawa, Yokohama, Japan

[73] Assignee: Victor Company of Japan, Limited, Japan

[21] Appl. No.: 720,208

[22] Filed: Sep. 3, 1976

[30] Foreign Application Priority Data

Sep. 12, 1975 [JP] Japan .................................. 50-125725

[51] Int. Cl.² ............................................. G11B 15/00
[52] U.S. Cl. ..................................... 360/137; 360/93
[58] Field of Search ..................... 360/93, 94, 95, 96, 360/137, 132; 242/197, 199

[56] References Cited

U.S. PATENT DOCUMENTS

| 3,765,685 | 10/1973 | Harlan et al. | 360/137 |
| 3,821,816 | 6/1974 | Habelt | 360/137 |
| 3,945,039 | 3/1976 | Yoshii | 360/137 |
| 4,005,488 | 1/1977 | Asai et al. | 360/94 |

Primary Examiner—Vincent P. Canney
Attorney, Agent, or Firm—Lowe, King, Price & Markva

[57] ABSTRACT

A cassette holder pivotally supported at its rear end and adapted to allow the insertion of cassettes at a set position within a cassette tape recorder. The cassette holder has a pivoted section capable of movement against the force of a spring so that the cassette holder can be rotated through a larger angle of inclination by removing it from a stopper which limits the angle of inclination, whereby a cassette can be directly placed within the tape recorder by inserting it below the cassette holder which has been rotated through the larger angle of inclination.

6 Claims, 5 Drawing Figures

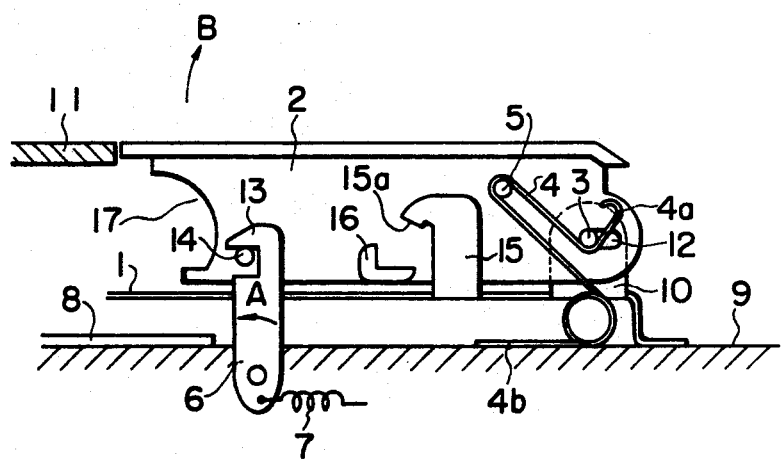

CASSETTE HOLDER CAPABLE OF ROTATION THROUGH A LARGER ANGLE OF INCLINATION

This invention relates to an improved kangaroo-type cassette holder for a cassette tape recorder.

In tape recorders equipped with conventional kangaroo-type cassette holders, cassettes cannot be inserted within the tape recorder without using the cassette holder. As a consequence, head adjustments are difficult since the cassette holder interferes with the adjustment operation and hence a separate head cover must be provided to allow access to the heads.

It is, therefore, an object of this invention to eliminate the need for a separate head cover by providing a cassette holder which, through a two-step operation, can be by-passed when heads are to be adjusted so as to allow a cassette to be directly placed within a tape recorder.

Figure 1:
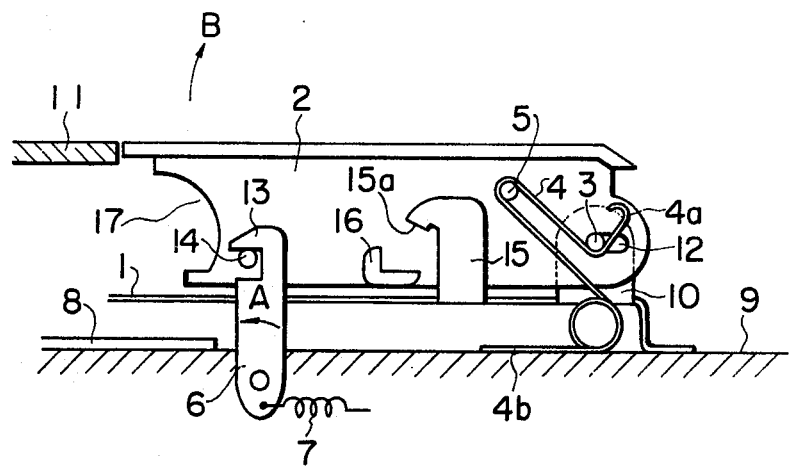
Figure 2:
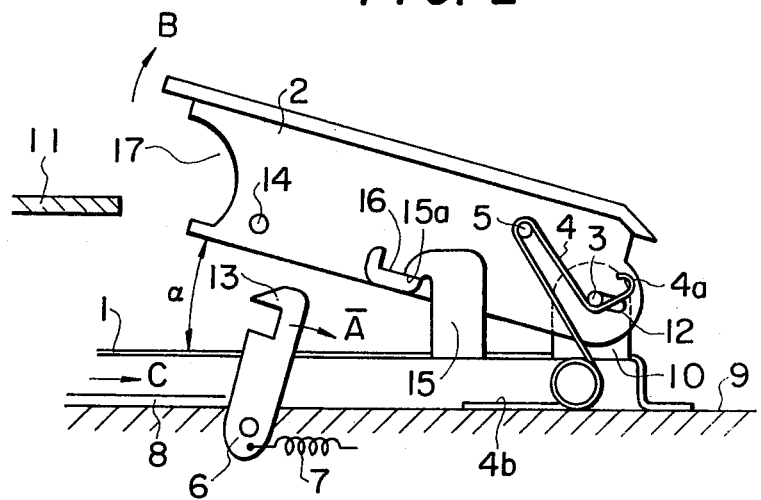
Figure 3:
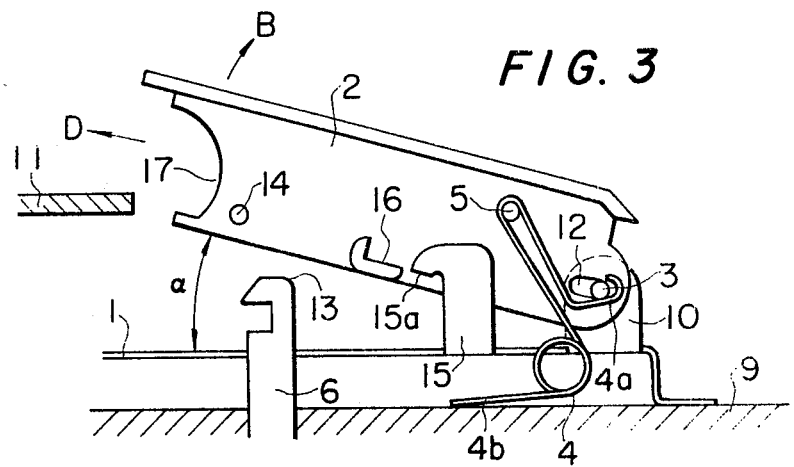
Figure 4:
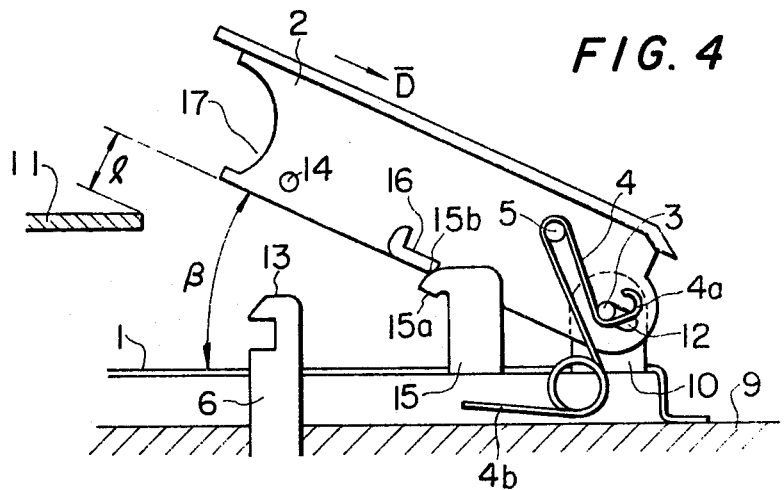
Figure 5:
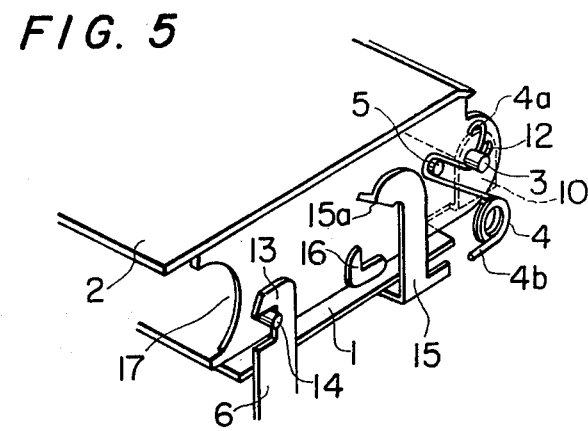

In the accompanying drawings; in which:

FIGS. 1 to 4 are side views illustrating a preferred embodiment of this invention, wherein FIG. 1 shows the cassette holder in a closed condition, FIG. 2 shows it in an open condition, FIG. 3 shows the cassette holder in the process of being shifted to the condition shown in FIG. 4, and FIG. 4 shows the cassette holder in a condition for head adjustment, and FIG. 5 is a perspective view of this invention. From FIG. 5 it is seen that more than one embodiment of stopper 15 is expressly contemplated.

Referring now to the drawings, there is shown a cassette holder supporting plate 1 fixed to chassis 9 of a cassette tape recorder. Reference numeral 2 denotes a kangaroo-type cassette holder the rear end of which is pivotally supported by pivot shaft or axle 3 projecting from bracket 10 which is mounted to cassette holder supporting plate 1. The portion at which cassette holder 2 is pivoted is provided with an elongated slot or hole 12 disposed longitudinally of the holder. Denoted by 4 is a biasing means such as spring fastened to the side surface of cassette holder 2 by means of screw 5. One end 4b of spring 4 is wound in coil-like fashion and brought into pressured contact with chassis 9 while the other end 4a after being brought into pressured contact with axle 3 is bent at a right-angle, extended and then further bent in a U-shaped fashion. Reference numeral 6 denotes a lock lever serving as a lock means which is pivotally supported by chassis 9 and biased by spring 7 in a direction as indicated by arrow A. Hook 13 located at the end of lock lever 6 is disposed so as to engage engaging pin 14 projecting from the side surface of cassette holder 2. The engagement is overcome by means of an eject bar 8 which slides on the surface of chassis 9 and serves as a releasing means to release the locking operation. Numeral 15 denotes a stopper projecting from cassette holder supporting plate 1. The end 15a of stopper 15 is provided with a hook-shaped configuration disposed in the rotational trajectory of projection 16 mounted to the side surface of cassette holder 2.

FIG. 1 shows cassette holder 2 in a closed condition. Although spring 4 the end 4b of which presses against chassis 9 urges cassette holder 2 to rotate about axle 3 in the direction shown by arrow B, lock lever 6 is engaged with pin 14 so that cassette holder 2 is held in a closed condition. This then is the operating position for cases in which a cassette has been inserted into the cassette holder.

In FIG. 2, sliding eject bar 8 in the direction indicated by arrow C causes lock lever 6 to pivot against spring 7 in the direction indicated by arrow A so that hook 13 separates from pin 14. As a result, the force exerted by the end 4b of spring 4 causes cassette holder 2 to rotate in the direction indicated by arrow B until projection 16 abuts against the end 15a of stopper 15. Cassette holder 2 thus rotates through an angle $\alpha$ before it is brought to a stop. This represents the normally open condition. Thus opening 17 of cassette holder 2 is raised to a position above panel 11 to allow cassettes to be inserted or removed. After having done so, the cassette holder is closed by pressing it down so as to once again engage lock lever 6 with pin 14.

Since the end 4a of spring 4 is in pressured contact with axle 3 at the point where the spring has been provided with a right-angle, the relative positional relationship between axle 3 and spring 4 is stable about said point and does not change. In other words, as cassette holder 2 travels along elongated hole 12, the portion of spring 4 contacting axle 3 shifts toward the end 4a (FIG. 3) which therefore bends so as to apply a restoring force to cassette holder 2 due to the resiliency of the spring. Accordingly, cassette holder 2 does not move indiscriminately from the position at which the forward end of elongated hole 12 contacts axle 3, as shown in FIGS. 1 and 2, whereby the positional relationship between spring 4 and axle 3 does not change.

The cassette holder as thus described is capable of pivoting between the closed and open conditions in a manner similar to that of conventional cassette holders.

To perform a head adjustment, cassette holder 2 is brought from the open condition shown in FIG. 2 to the condition shown in FIG. 3 by pulling it along elongated hole 12 in the direction indicated by arrow D. This operation is performed against the biasing force which is caused by bending the end 4a of spring 4. Since pulling the cassette holder forward removed projection 16 from hook 15a of stopper 15, cassette holder 2 can then be rotated through an angle of inclination larger in magnitude than angle $\alpha$. After this has been accomplished and the pulling force in the direction D removed, the biasing force exerted by the end 4a of spring 4 causes cassette holder 2 to shift in the direction indicated by arrow D in FIG. 4 so that the forward end of elongated hole 12 contacts axle 3. Projection 16, moreover, abuts against the back 15b of hook 15a so that cassette holder 2 is inclined and held at an angle $\beta$. In this condition the lower surface of cassette holder 2 clears panel 11 by a distance $l$ so as to form a gap through which a cassette (not shown) can be directly inserted and set in a tape recorder by placing it below the lower surface of cassette holder 2. It is therefore possible to perform a head adjustment without interference from cassette holder 2 since it is in the raised position.

When cassette holder 2 as shown in FIG. 4 is pressed downward, projection 16 is pressed against the back 15b of stopper 15. Since the back portion 15b is provided with a suitably curved surface, a force is applied upon projection 16 and acts in a direction as indicated by arrow D in FIG. 3. As a result, projection 16 slides over the back portion 15b and passes over hook 15a. Cassette holder 2 is closed completely by continuing to push it in a downward direction.

According to the structure of the present invention, the portion at which the cassette holder is pivoted is capable of both rotational and parallel movement. The capability of movement in a parallel manner makes it possible to remove the cassette holder from the stopper limiting the opening angle, thus allowing the cassette holder to be rotated through a larger angle of inclination so that a cassette can be inserted below the cassette holder and set directly into the tape recorder. Hence, the cassette holder may be left in the raised position so that cassettes can be set directly without using the cassette holder as an intermediary and heads adjusted without interference. In addition, cassettes can be inserted and removed in a conventional manner when the cassette holder is employed in normal fashion by virtue of the fact that the pivoted portion is biased by the spring so that it will not move.

What is claimed is:

1. In a cassette tape recorder having a chassis and a cassette holder supporting plate, the improvement comprising:

a bracket mounted on said cassette holder supporting plate and carrying thereon a pivot shaft;

a cassette holder having an elongated slot formed at a rear end of said cassette holder longitudinally thereof and pivotally supported by said pivot shaft engaging said elongated slot;

biasing means for urging said cassette holder in a direction to bring said cassette holder into its open condition;

locking means for holding said cassette holder in its closed condition against the action of said biasing means;

releasing means for releasing said locking means from said cassette holder to cause said cassette holder to rotate into its open condition by the action of said biasing means; and stopper means for maintaining said cassette holder in its open condition;

said cassette holder being movable forward along said elongated slot to disengage from said stopper means whereby said cassette holder is rotatable through a larger angle of inclination so that a cassette can be directly placed within said tape recorder.

2. The improvement according to claim 1, in which said biasing means comprises a spring fastened to a side surface of said cassette holder by means of a screw fixed thereto.

3. The improvement according to claim 2, in which said spring has one end wound in coil-like fashion and brought into pressured contact with said chassis and the other end after being brought into pressured contact with said pivot shaft bent at a right angle, extended and then further bent in a U-shaped fashion.

4. The improvement according to claim 1, in which said locking means comprises a lock lever pivotally supported by said chassis and normally urged in a direction to engage an engaging pin supported on said cassette holder.

5. The improvement according to claim 1, in which said releasing means comprises a sliding eject bar slidable on said chassis to rotate said locking means in its released condition.

6. The improvement according to claim 1, in which said stopper means comprises a stopper supported on said cassette holder supporting plate, and a projection formed on said cassette holder and engageable with said stopper when said locking means is released from said cassette holder by the action of said releasing means.

* * * * *